(12) United States Patent
Lan et al.

(10) Patent No.: US 8,922,739 B2
(45) Date of Patent: Dec. 30, 2014

(54) LIQUID CRYSTAL DISPLAY WITH PARTICULAR STRUCTURE FOR THE PIXEL ELECTRODE AND THE COMMON ELECTRODE

(71) Applicants: AU Optronics Corp., Hsin-Chu (TW); University of Central Florida Research Foundation Inc., Orlando, FL (US)

(72) Inventors: Yi-Fen Lan, Hsin-Chu (TW); Cheng-Yeh Tsai, Hsin-Chu (TW); Shin-Tson Wu, Orlando, FL (US); Yi-Fan Liu, Orlando, FL (US)

(73) Assignees: AU Optronics Corp., Science-Based Industrial Park, Hsin-Chu (TW); University of Central Florida Research Foundation Inc., Orlando, FL (US)

(*) Notice: Subject to any disclaimer, the term of this patent is extended or adjusted under 35 U.S.C. 154(b) by 152 days.

(21) Appl. No.: 13/729,042

(22) Filed: Dec. 28, 2012

(65) Prior Publication Data

US 2014/0184991 A1    Jul. 3, 2014

(51) Int. Cl.
*G02F 1/1335* (2006.01)
*G02F 1/1343* (2006.01)

(52) U.S. Cl.
CPC .... *G02F 1/134309* (2013.01); *G02F 1/134363* (2013.01)
USPC .............. 349/96; 349/141; 349/144; 349/146

(58) Field of Classification Search
CPC .................... G02F 1/133528; G02F 1/133536; G02F 1/134363; G02F 1/133707; G02F 1/136213; G02F 1/134336; G02F 1/1393; G02B 5/3033
USPC ..................................... 349/96, 141, 144, 146
See application file for complete search history.

(56) References Cited

U.S. PATENT DOCUMENTS

| 7,199,852 | B1 | 4/2007 | Lu |
| 8,111,358 | B2* | 2/2012 | Shibahara ........................ 349/96 |
| 2005/0237465 | A1* | 10/2005 | Lu et al. ......................... 349/141 |
| 2010/0182558 | A1* | 7/2010 | Lu et al. ......................... 349/141 |

FOREIGN PATENT DOCUMENTS

JP    2010026324    2/2010

* cited by examiner

*Primary Examiner* — Mike Qi
(74) *Attorney, Agent, or Firm* — Winston Hsu; Scott Margo

(57) ABSTRACT

A liquid crystal display includes an upper substrate, a lower substrate, a liquid crystal layer disposed between the upper and lower substrates and including liquid crystal molecules with optical isotropicity, a first polarizer disposed on a surface of the upper substrate, having a first polarization direction, a second polarizer disposed on a surface of the lower substrate, having a second polarization direction, and at least one pixel region defined on the lower substrate. The pixel region includes at least one pixel electrode disposed on the lower substrate, the pixel electrode extending along a first direction in the pixel region and a majority portion of an edge of the pixel electrode substantially being parallel to at least one of the first polarization direction and the second polarization direction.

18 Claims, 10 Drawing Sheets

LIQUID CRYSTAL DISPLAY WITH PARTICULAR STRUCTURE FOR THE PIXEL ELECTRODE AND THE COMMON ELECTRODE

BACKGROUND OF THE INVENTION

1. Field of the Invention

The present invention is related to a liquid crystal display (LCD), and more particularly, to an LCD including liquid crystal molecules with optical isotropicity.

2. Description of the Prior Art

LCD has been widely applied to many display devices. One of the key elements of an LCD is the liquid crystal layer with liquid crystal molecules. The conventional liquid crystal molecules used in the LCD have a property of optical anisotropicity under room temperature and have oval-liked shapes. However, a type of liquid crystal molecules with optical isotropicity under room temperature, such as blue phase liquid crystal (BPLC) molecules is a new research field for LCD manufacturer. An example of the BPLC molecules is cholesteryl benzoate molecules.

Generally, in a BPLC in-plane switch (IPS) LCD panel, the panel has a black state if no voltage is supplied because of the optical isotropicity of the BPLC molecules, which is called normal black state. In contrast, when a voltage is applied to the electrodes of the BPLC IPS LCD panel, the shapes of the BPLC molecules will be deformed so as to have optical anisotropicity and birefringence, such that the panel displays a white state. However, due to compression and molecules' alignment property, the BPLC molecules also are deformed by the electrodes even no voltage is applied. The BPLC molecules near the electrodes line along the sidewalls or edges of the electrodes so that they also have oval-liked shapes with optical anisotropicity and birefringence. As a result, light leakage occurs along the edge or shapes of the electrodes when the panel is under dark state, and therefore the contrast of the display panel is influenced.

SUMMARY OF THE INVENTION

It is therefore one of the objectives of the present invention to provide an LCD having liquid crystal molecules with optical isotropicity and good contrast by designing the electrodes with specific shapes.

According to an embodiment of the present invention, an LCD includes an upper substrate, a lower substrate, and a liquid crystal layer disposed between the upper and lower substrates and including liquid crystal molecules with optical isotropicity. The LCD further includes a first polarizer disposed on a surface of the upper substrate and having a first polarization direction, a second polarizer disposed on a surface of the lower substrate and having a second polarization direction, and at least one pixel region defined on the lower substrate. The pixel region includes at least one pixel electrode disposed on the lower substrate, the pixel electrode extending along a first direction in the pixel region and a majority portion of an edge of the pixel electrode substantially being parallel to at least one of the first polarization direction and the second polarization direction.

Since the majority portion of the edge of the pixel electrode is substantially parallel to at least one of the first polarization direction and the second polarization direction, the liquid crystal molecules near the pixel electrodes will also line along at least one of the first and the second polarization directions. Therefore, even light passes through these liquid crystal molecules is polarized, it still hardly emits out the LCD panel, so as to solve the problem of light leakage in the prior art and to improve the display contrast.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
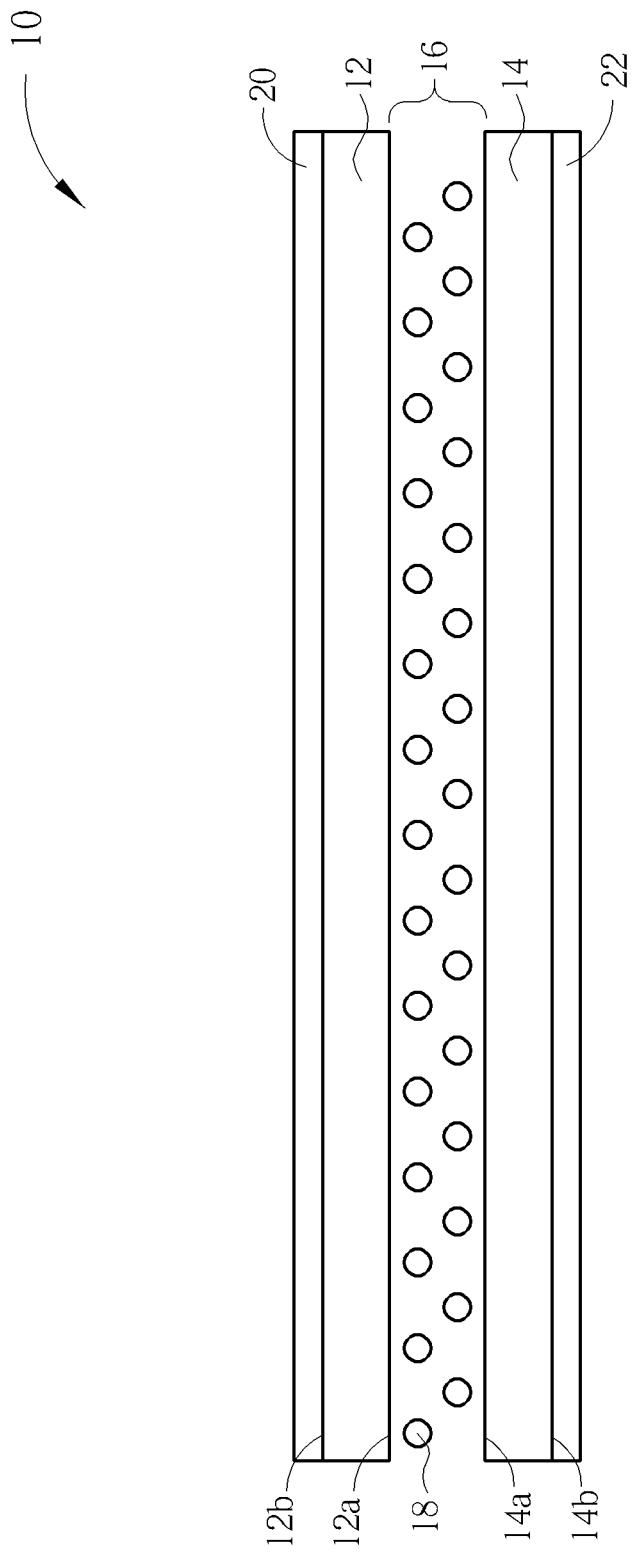
FIG. 1 is a cross-view schematic diagram of an LCD of the present invention.

Referring to FIG. 1, FIG. 1 is a cross-view schematic diagram of an LCD of the present invention. According to a first embodiment, the LCD 10 is an IPS LCD panel, including an upper substrate 12, a lower substrate 14 disposed below the upper substrate 12, a liquid crystal layer 16 disposed between the upper and lower substrates. The liquid crystal layer 16 includes liquid crystal molecules 18 with optical isotropicity. In this embodiment, the liquid crystal molecules 18 are BPLC molecules, such as cholesteryl benzoate molecules, and they have spherical shapes under room temperature. The LCD 10 further includes a first polarizer 20 having a first polarization direction P1 and a second polarizer 22 having a second polarization direction P2. The first polarizer 20 and the second polarizer 22 are disposed near the upper substrate 12 and the lower substrate 14 respectively. For example, the first polarizer 20 is disposed on an upper surface 12b of the upper substrate 12, and the second polarizer 22 is disposed on the lower surface 14b of the lower substrate 14. In this embodiment, the first polarization direction P1 is perpendicular to the second polarization direction P2, but not limited thereto. In other embodiments, the first polarization direction P1 may be parallel to the second polarization direction P2.

Figure 2:
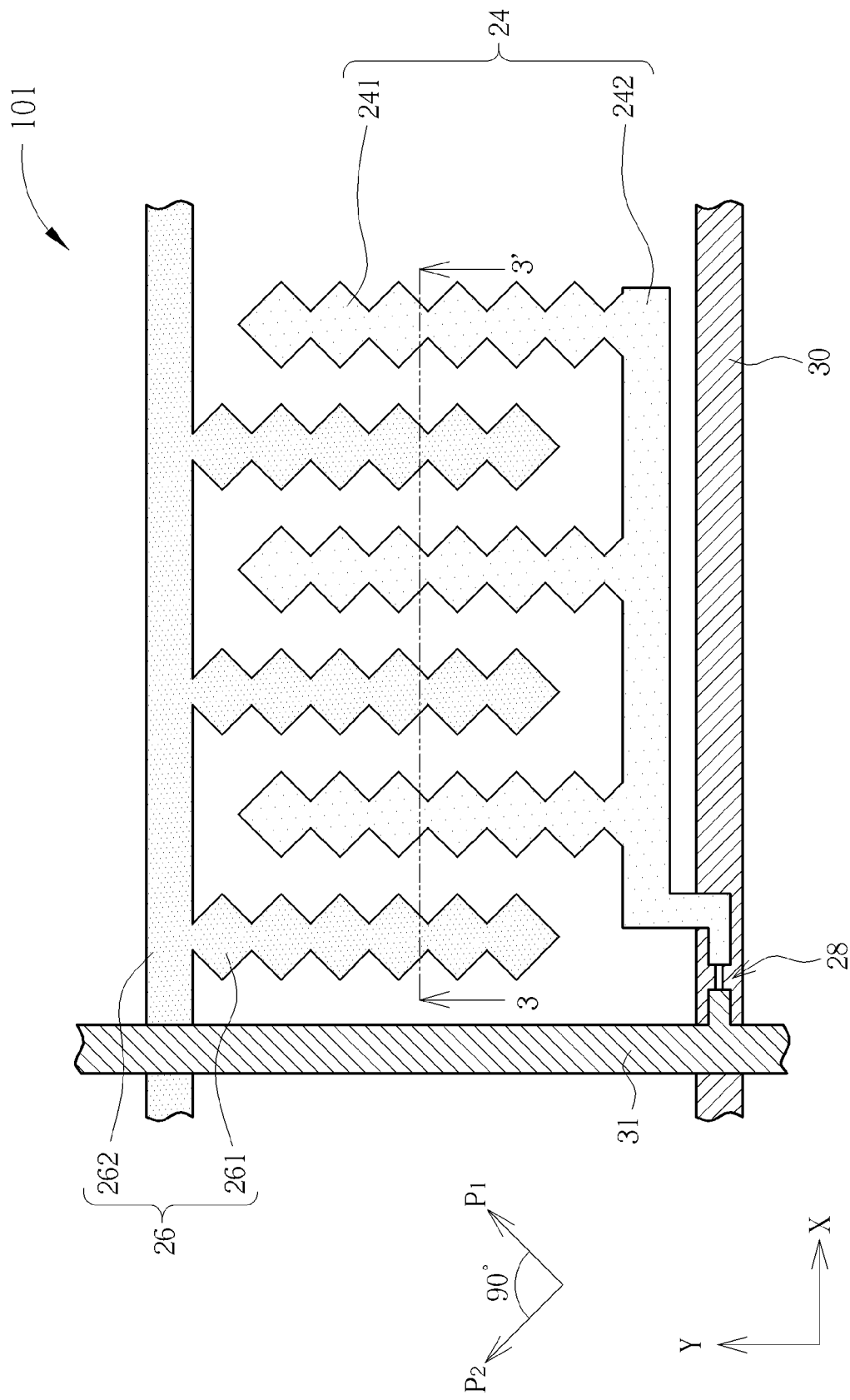
FIG. 2 is a schematic diagram of a top view of a pixel region of the LCD shown in FIG. 1.
Figure 3:
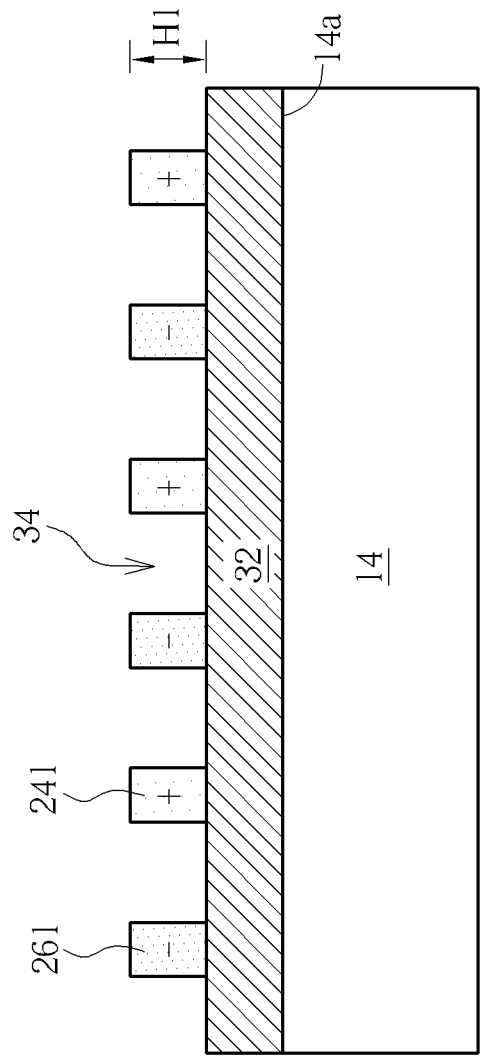
FIG. 3 is a sectional view of FIG. 2 along a sectional line 3-3'.

Please refer to FIG. 2 and FIG. 3, wherein FIG. 2 is a schematic diagram of a top view of a pixel region of the LCD 10 shown in FIG. 1, and FIG. 3 is a sectional view of FIG. 2 along a sectional line 3-3'. The LCD 10 includes at least one pixel region 101 defined on the lower substrate 14. Preferably, the LCD 10 includes a plurality of pixel regions 101 arranged as an array. The pixel region 101 includes at least one data line 31 extending along a first direction Y and at least one gate line 30 extending along a second direction X. A thin film transistor 28 is disposed at the cross portion of the gate line 30 and the data line 31. The pixel region 101 further includes at least one pixel electrode 241 extends along the first direction Y. In this embodiment, the pixel region 101 includes a plurality of pixel electrodes 241. For example, FIG. 2 shows three pixel electrodes 241 in one pixel region 101. The pixel electrodes 241 are electrically connected to each other through a pixel electrode bar 242 extending along the second direction X, and the pixel electrodes 241 and the pixel electrode bar 242 in the pixel region 101 can be seen as a pixel electrode unit 24. Since the LCD 10 is an IPS LCD, the pixel region 101 may also include a plurality of common electrodes 261, extending along the first direction Y. The common electrodes 261 are electrically connected to each other through a common electrode bar 262 extending along the second direction X, and the common electrodes 261 and the common electrode bar 262 in the pixel region 101 can be seen as a common electrode unit 26. In this embodiment, the data line 31, the gate line 30, the thin film transistor 28, the pixel electrode unit 24, and the common electrode unit 26 are disposed on the upper surface 14a of the lower substrate 14, but not limited thereto. For example, the common electrode unit 26 may be disposed on the lower surface 12a of the upper substrate 12 in other embodiments.

As shown in FIG. 3, the common electrodes 261 and the pixel electrodes 241 are disposed alternately and parallel to each other, thus there are several cavities 34 formed between the adjacent common electrodes 261 and the pixel electrodes 241. The pixel electrodes 241 and the common electrodes 261 are disposed on the upper surface 14a of the lower substrate 14, and a passivation layer 32 may be disposed between the pixel and common electrodes 241, 261 and the lower substrate 14. The pixel electrode unit 24 and the common electrode unit 26 may be formed with a same conductive layer, preferably a transparent conductive layer, and have a height H1. The liquid crystal molecules 18 may fill up the cavities 34 with the height H1. For instance, when driving the pixel region 101, a common voltage (such as a negative voltage, −1.5 volt) may be applied to the common electrodes 261 and a driving voltage (such as a positive voltage, 1.5 volt) may be applied to the pixel electrodes 241 such that a lateral electric field occurs between the pixel electrodes 241 and the common electrodes 261, especially in the cavities 34, which drives the liquid crystal molecules 18 to be deformed and have birefringence so as to polarizes light passes through the liquid crystal layer 16.

Figure 4:
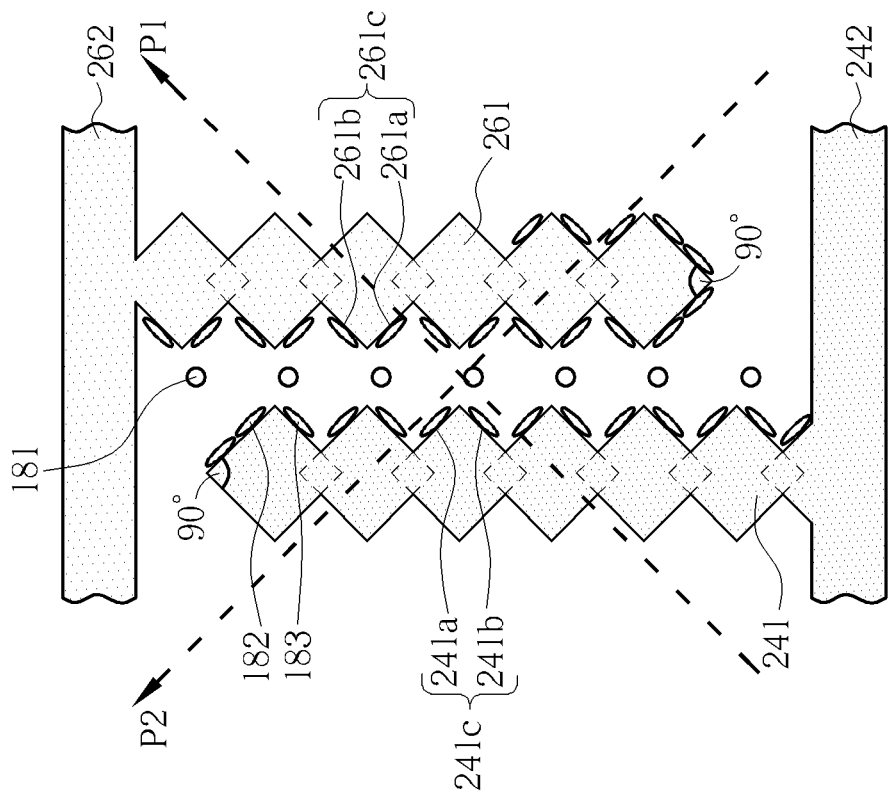
FIG. 4 is a partial enlargement figure of the pixel electrode and the common electrode shown in FIG. 2.

As shown in FIG. 2, the first polarization direction P1 and the second polarization direction P2 have an included angle of 90° in this embodiment. Taking the second direction X being a coordinate with 0° as an example, the first polarization direction P1 has an included angle 45° with the second direction X, and the second polarization direction P2 has an included angle 135° with the second direction X. The first polarization direction P1 and the second polarization direction P2 also have an included angle of about 45° with the first direction Y. Please refer to FIG. 4 with FIG. 2, wherein FIG. 4 is a partial enlargement figure of the pixel electrode 241 and the common electrode 261 shown in FIG. 2. Each of the pixel electrodes 241 is composed of a plurality of quadrilateral cubes 241c arranged as a line in series in the pixel region 101, wherein the line is parallel to the first direction Y, and at least one portion of each of the quadrilateral cubes 241c in the same series is overlapped by an adjacent quadrilateral cube 241c, as shown in the doted lines. Preferably, the quadrilateral cubes 241c are parallelogram cubes. Two sides 241a of each quadrilateral cube 241c are parallel to each other, and the other two sides 241b of the quadrilateral cube 241c are parallel to each other. Moreover, the two sides 241a are parallel to the second polarization direction P2, and the other two sides 241b are parallel to the first polarization direction P1. Accordingly, any two adjacent sides 241a and 241b of each quadrilateral cubes 241c have an included angle of 90°. In a more preferable embodiment, the quadrilateral cubes 241c are rhombus cubes or square cubes, which means the sides 241a and the sides 241b have identical length. As a result, the majority portion of the edge of each pixel electrode 241 is substantially parallel to at least one of the first polarization direction P1 and the second polarization direction P2. Specifically, according to this embodiment, about a half majority portion of the edge of each pixel electrode 241 is parallel to the first polarization direction P1, such as the sides 241b, and the other half majority portion of the edge of each pixel electrode 241 is parallel to the second polarization direction P2, such as the sides 241a. Similarly, each of the common electrodes 261 is composed of a plurality of quadrilateral cubes 261c arranged as a line in series in the pixel region 101, wherein the line is parallel to the first direction Y, and at least one portion of each of the quadrilateral cubes 261c in the same series is overlapped by an adjacent quadrilateral cube 261c.

Two sides 261a of each quadrilateral cube 261c are parallel to the second polarization direction P2, and the other two sides 261b are parallel to the first polarization direction P1. Preferably, the quadrilateral cubes 261c are rhombus cubes or square cubes, and the sides 261a and the sides 261b have identical length. More preferably, the quadrilateral cubes 261c and the quadrilateral cubes 241c have the same sizes.

FIG. 4 also shows the arrangement of the BPLC molecules 181, 182, 183 between the pixel and common electrodes 241, 261 when no voltage is applied. The sizes and number of the BPLC molecules 181, 182, 183 relative to the sizes of the quadrilateral cubes 241c, 261c in FIG. 4 are only for explanation, not for limiting the present invention. The BPLC molecules 181 disposed not near the pixel electrode 241 and the common electrode 261 have their usual spherical shape and optical isotropicity. The BPLC molecules 182, 183 disposed near the majority portion of the edge (sides 241a, 241b) of the pixel electrode 241 and the majority portion of the edge (sides 261a, 261b) of the pixel electrode 261 are deformed along the edges to have optical anisotropicity. For example, the BPLC molecules 182 near the sides 241a are deformed to have a long axis arranged along the sides 241a, which are parallel to the second polarization direction P2, and the BPLC molecules 183 near the sides 241b are deformed to have a long axis arranged along the sides 241b, parallel to the first polarization direction P1. Assume light emits from the lower side of the LCD 10 and first passes through the second polarizer 22 and become a polarized light with the second polarization direction P2. Since the long axes of the BPLC molecules 182, 183 are aligned along the first polarization direction P1 or the second polarization direction P2, the polarized light passes through the BPLC molecules 182, 183 will still remain as polarized light with the second polarization direction P2. Therefore, the light leakage near the edges of the electrodes under the dark state occurred in the prior art LCD panel can be effective suppressed.

It should be noted that the pixel and common electrodes 241 and 261 may not always have the sharp corners between the sides 241a and 241b or between the sides 261a and 261b shown in FIG. 2 and FIG. 4 practically because of process limitation, process window and formation inaccuracy. For example, after photolithography and development processes, the included angle of the sides 241a and 241b and the included angles of the sides 261a and 261b may have round corners. Therefore, the majority portion of the edges of the pixel electrodes 241 and common electrodes 261 is substantially parallel to the first polarization direction P1 or the second polarization direction P2 means that the sides 241a, 261a may have an included angle with the second polarization direction P2 less than or equal to ±4° and the sides 241b, 261b may have an included angle with the first polarization direction P1 less than or equal to +4°. In other words, the situation that the included angle of the edges of the pixel and common electrodes 241, 261 and the second polarization direction P2 or the first polarization direction P1 is 0°+4° still meets the meaning "substantially parallel" in the above description. In another aspect, when most tangent lines of the edges of the pixel electrodes 241 or the common electrodes 261 are parallel to at least one of the first and second polarization directions P1, P2 or have included angles less than or equal to +4°, it also meets the description that the majority portion of the edges of the pixel electrodes 241 and common electrodes 261 is substantially parallel to at least one of the first and second polarization directions P1, P2.

Figure 5:
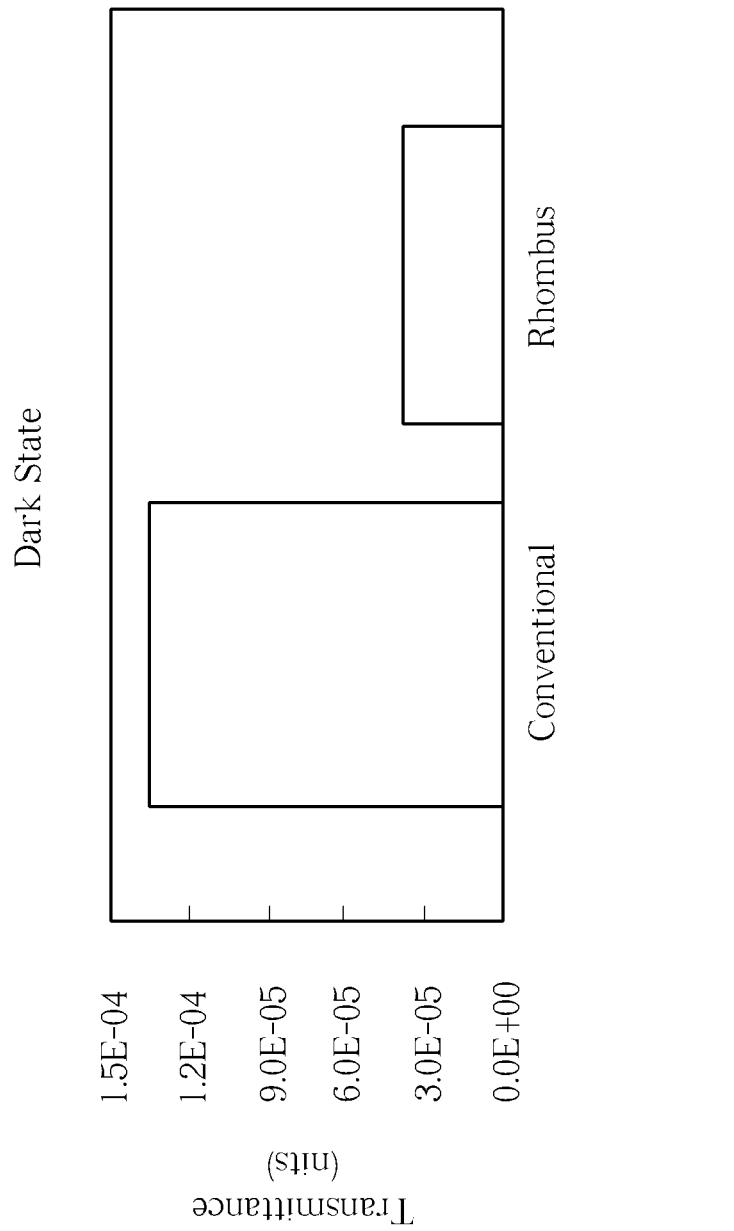
FIG. 5 is a diagram of the transmittances of a conventional BPLC IPS LCD and the present invention BPLC IPS LCD with rhombus shape electrodes under dark state.
Figure 6:
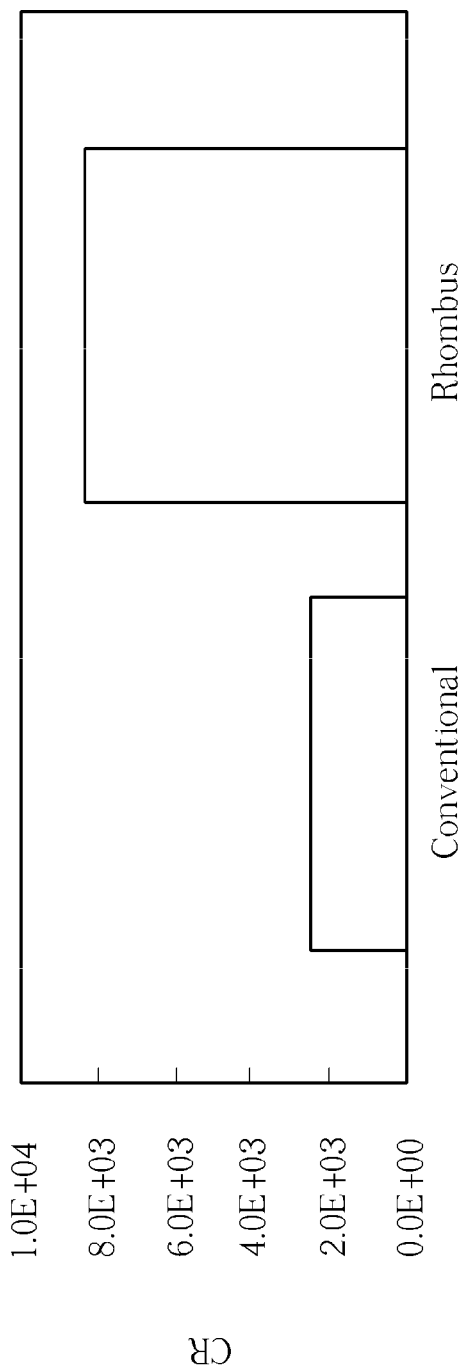
FIG. 6 is a diagram of the contrast (CR) of the conventional BPLC IPS LCD and the present invention BPLC IPS LCD with rhombus shape electrodes.

FIG. 5 is a diagram showing the transmittances of a conventional BPLC IPS LCD and the present invention BPLC IPS LCD with rhombus shape electrodes under dark state. As shown in FIG. 5, the conventional BPLC IPS LCD has a transmittance of more than $1.2*10^{-4}$ nits under normal dark state, and the BPLC IPS LCD with rhombus shape electrodes according to the first embodiment of the present invention only has a transmittance less than $5*10^{-5}$ nits. FIG. 6 is further illustrates a diagram showing the contrast (CR) of the conventional BPLC IPS LCD and the present invention BPLC IPS LCD with rhombus shape electrodes.

As shown in FIG. 6, the conventional BPLC IPS LCD only has a contrast less than $3*10^3$, and the BPLC IPS LCD with rhombus shape electrodes according to the first embodiment of the present invention has a contrast higher than $8*10^3$. Accordingly, the present invention BPLC IPS LCD has a better performance than the conventional BPLC IPS LCD, whether regarding light leakage problem or the display contrast. Furthermore, since the pixel electrodes 241 and the common electrodes 261 have curved and bending edges, they provided a multi-domain effect to the liquid crystal molecules 18 such that the gamma shift can be improved. According to the first embodiment of the present invention, the maximum gamma shift is about 7%, and the maximum gray level inversion is about 5%. Accordingly, the present invention LCD 10 not only has good contrast but also have low gamma shift.

The LCD structure of the present invention is not limited by the aforementioned embodiment, and may have other different preferred embodiments and variation embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 7:
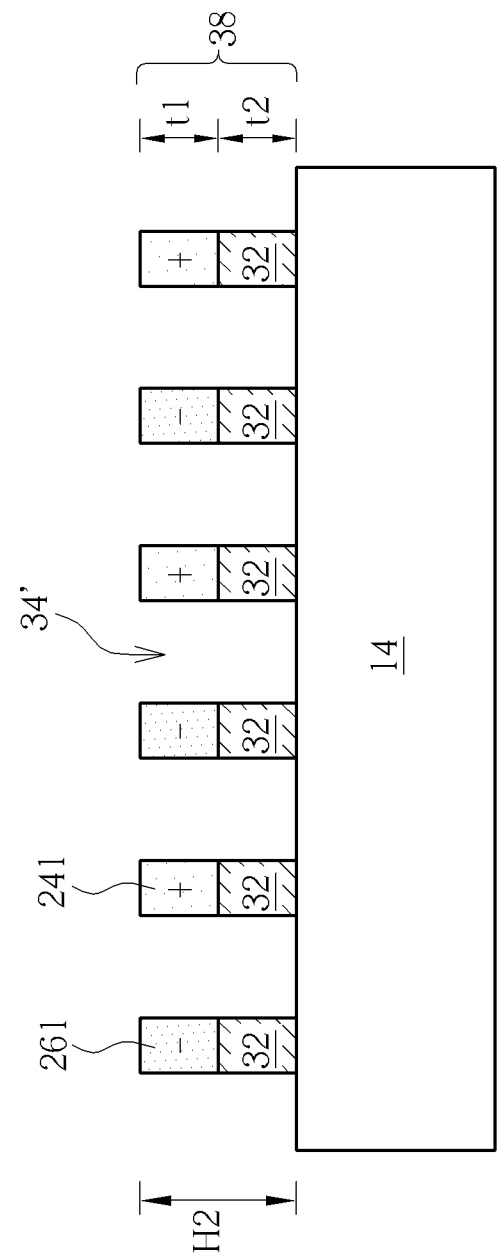
FIG. 7 is a sectional schematic diagram of the pixel electrodes and common electrodes corresponding to the sectional line 3-3' in FIG. 2 according to a first variation embodiment of the first embodiment.

Please refer to FIG. 7, which shows a sectional schematic diagram of the pixel electrodes 241 and common electrodes 261 corresponding to the sectional line 3-3' in FIG. 2 according to a first variation embodiment of the first embodiment. In this variation embodiment, the pixel region 101 has a groove structure 38 that the passivation layer 32 disposed below the pixel electrodes 241 and the common electrodes 261 has many slits corresponding to the spacing between the adjacent pixel electrodes 241 and common electrodes 261. In other words, the slits of the passivation layer 32 are corresponding to the edges of the pixel electrodes 241 and the common electrodes 261. Therefore, the cavities 34' disposed between the pixel electrodes 241 and common electrodes 261 have a height H2 which is the sum of the thickness t1 of the pixel electrodes 241 and the common electrodes 261 and the thickness t2 of the passivation layer 32. For example, the thickness t1 is about 400 angstroms (Å) and the thickness t2 is about 2000 Å, thus the height H2 of the groove structure 38 is about 2400 Å, but not limited thereto. In some embodiments, the height H2 is about 0.04 micrometers (μm) to 5 μm and preferable about 1 μm to 1.5 μm. In other embodiments, the passivation layer 32 may have a thickness t2 more than 2000 Å or the thickness t1 is less than 1 μm.

Figure 8:
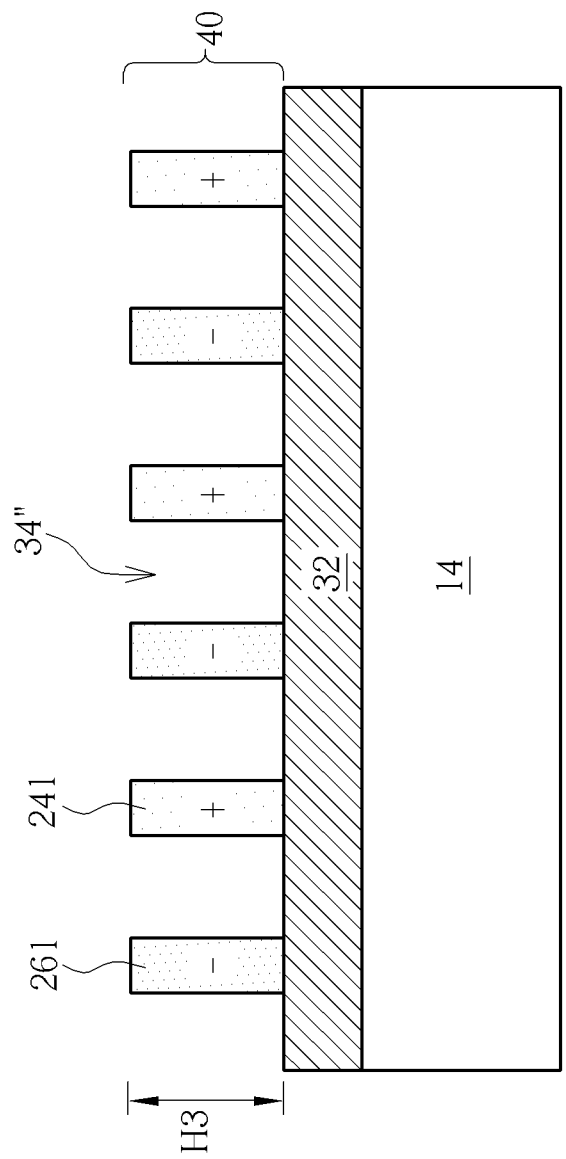
FIG. 8 is a sectional schematic diagram of the pixel electrodes and common electrodes corresponding to the sectional line 3-3' of FIG. 2 according to a second variation embodiment of the first embodiment.

Please refer to FIG. 8. FIG. 8 is a sectional schematic diagram of the pixel electrodes 241 and common electrodes 261 corresponding to the sectional line 3-3' of FIG. 2 according to a second variation embodiment of the first embodiment. In this variation embodiment, the pixel region 101 has a protrusion structure 40, wherein the thickness of the pixel electrodes 241 and common electrodes 261 is greater than that in the first embodiment. Therefore, the cavities 34" between the pixel electrodes 241 and common electrodes 261 have a height H3 greater than the height H1 shown in FIG. 3. For example, the thickness of the pixel electrodes 241 and the common electrodes 261 in this variation embodiment may be about 0.04 μm to 5 μm and preferable about 1 μm to 1.5 μm. In some embodiments, the height H3 is about two times the height H1 shown in FIG. 3, so as to form the protrusion structure 40.

In the first and second variation embodiments, both the cavities 34' and the cavities 34" have higher height H2 and height H3 than the cavities 34 in FIG. 3. Therefore, they have more spaces to containing the BPLC molecules. Accordingly, the effective literal electrical field occurred between the adjacent pixel electrodes 241 and common electrodes 261 covers greater range to drive the BPLC molecules when voltages are supplied to the pixel electrodes 241 and common electrodes 261, thus the voltage supply can be saved. For example, the supplied voltage for the pixel electrodes 241 and common electrodes 261 may be less than that in the first embodiment, so as to save the power.

Figure 9:
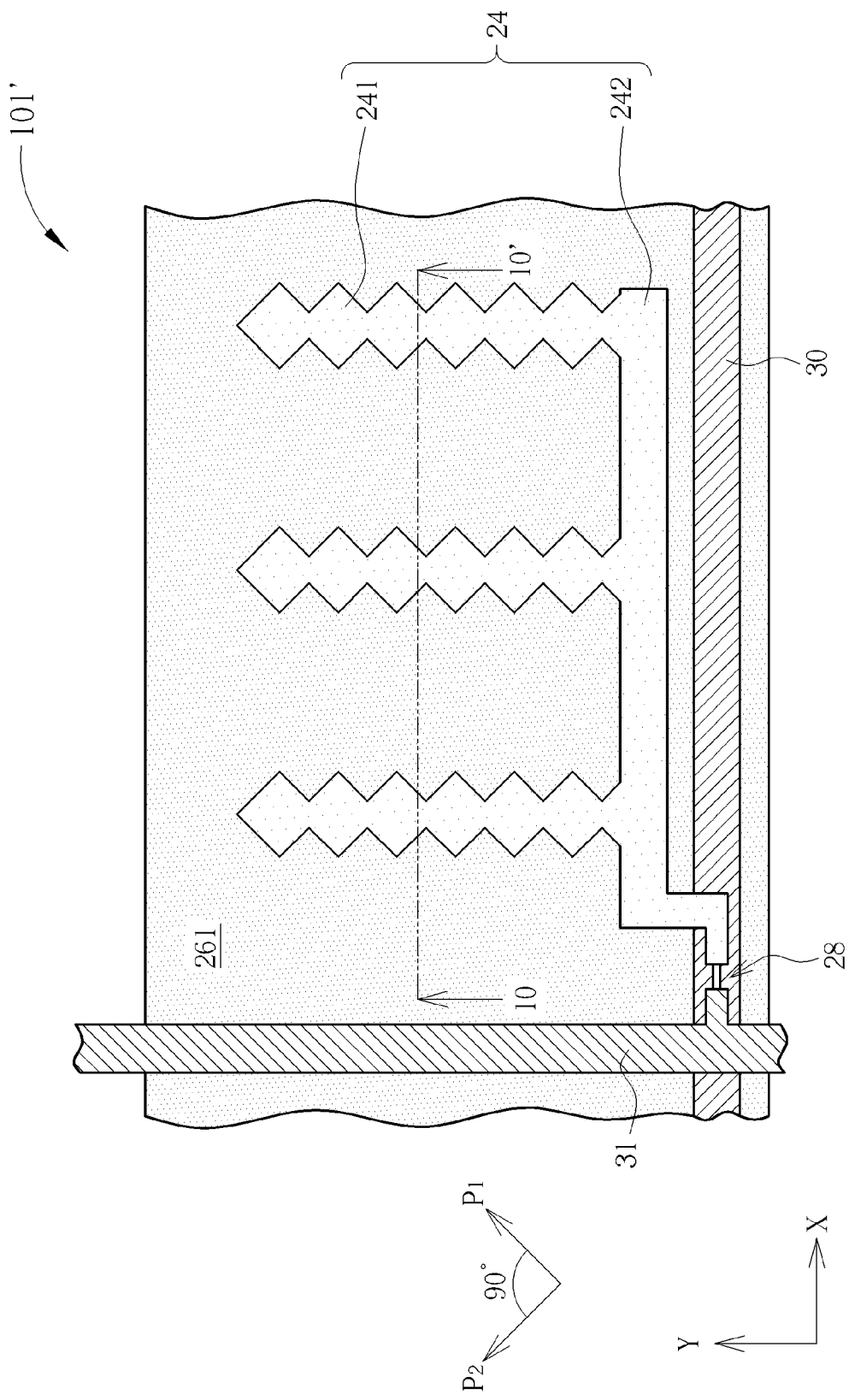
FIG. 9 is a schematic diagram of a top view of a pixel region of an LCD according to a second embodiment of the present invention.
Figure 10:
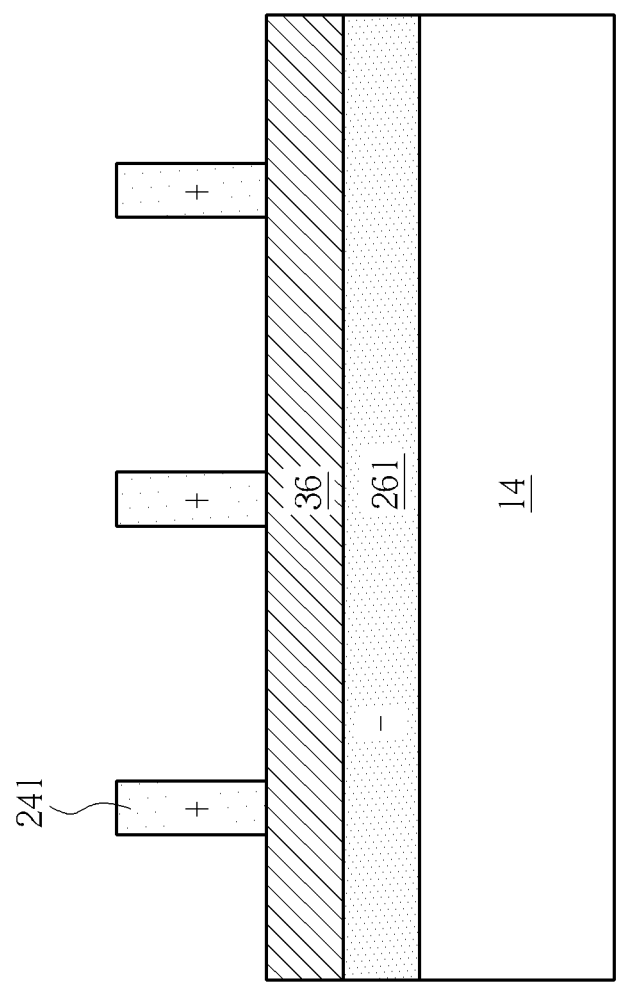
FIG. 10 is a sectional view of FIG. 9 along a sectional line 10-10'.

FIG. 9 is a schematic diagram of a top view of a pixel region of an LCD according to a second embodiment of the present invention, and FIG. 10 is a sectional view of FIG. 9 along a sectional line 10-10'. In this embodiment, the LCD is a fringe field switching (FFS) LCD. One pixel region 101' may only have one common electrode 261 which is like a sheet electrode covering the lower substrate 14, below the pixel electrodes 241, and an insulating layer 36 or other dielectric layer is disposed between the pixel electrodes 241 and the common electrode 261. When driving the LCD, two different voltages may be respectively supplied to the common electrode 261 and the pixel electrodes 241 such that an electrical field occurs between the pixel electrodes 241 and the common electrode 261 to drive the liquid crystal molecules 18. Since the majority portion of the edges of the pixel electrodes 241 are still substantially parallel to either the first polarization direction P1 or the second polarization direction P2, the present invention FFS LCD including the pixel regions 101' can provide good display contrast and have low gamma shift. Furthermore, the pixel regions 101' of the present invention FFS LCD may have groove or protrusion structures similar to the cavities 34' of FIG. 7 and cavities 34" of FIG. 8.

In conclusion, in the LCD having liquid crystal molecules with optical isotropicity of the present invention, since the most edges or sidewalls of the pixel electrode are parallel to at least one of the polarization directions of the first polarization and the second polarization, the light leakage and the gamma shift can be effectively improved, so as to provide a better display performance with high display contrast.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD), comprising:
   an upper substrate;
   a lower substrate;
   a liquid crystal layer, disposed between the upper and lower substrates and comprising liquid crystal molecules with optical isotropicity;
   a first polarizer disposed on a surface of the upper substrate, having a first polarization direction;
   a second polarizer disposed on a surface of the lower substrate, having a second polarization direction; and
   at least one pixel region defined on the lower substrate, wherein the pixel region comprises at least one pixel electrode disposed on the lower substrate, the pixel electrode extending along a first direction in the pixel region and a majority portion of an edge of the pixel electrode substantially being parallel to at least one of the first polarization direction and the second polarization direction.

2. The LCD of claim 1, wherein the pixel region further comprises at least one common electrode disposed on the lower substrate, the common electrode extending along the first direction in the pixel region and a majority portion of an edge of the common electrode substantially parallel to at least one of the first polarization direction and the second polarization direction.

3. The LCD of claim 2, comprising a plurality of common electrodes and a plurality of pixel electrodes in the pixel region, wherein the common electrodes and the pixel electrodes are disposed alternately and parallel to each other, the common electrodes are electrically connected to each other through a common electrode bar, and the pixel electrodes are electrically connected to each other through a pixel electrode bar.

4. The LCD of claim 3, wherein the LCD is an in-plane switching (IPS) LCD.

5. The LCD of claim 1, wherein the pixel region further comprises:
   at least one common electrode disposed between the pixel electrode and the lower substrate; and
   an insulating layer disposed between the pixel electrode and the common electrode.

6. The LCD of claim 5, wherein the LCD is a fringe field switching (FFS) LCD.

7. The LCD of claim 1, wherein the pixel electrode is composed of a plurality of quadrilateral cubes arranged as a line in series in the pixel region, the line is parallel to the first direction, and at least one portion of each of the quadrilateral cubes in the same series is overlapped by an adjacent quadrilateral cube.

8. The LCD of claim 7, wherein two sides of the quadrilateral cubes are parallel to one of the first polarization direction and the second polarization direction respectively, and the other two sides of the quadrilateral cubes are parallel to the other one of the first polarization direction and the second polarization.

9. The LCD of claim 7, wherein the quadrilateral cubes are rhombus cubes.

10. The LCD of claim 7, wherein any two adjacent sides of each of the quadrilateral cubes have an included angle of 90 degrees.

11. The LCD of claim 1, wherein the liquid crystal molecules deform to have optical anisotropicity when an electrical field is applied to the pixel region.

12. The LCD of claim 11, wherein the liquid crystal molecules are blue phase liquid crystal (BPLC) molecules.

13. The LCD of claim 11, when the electrical field is applied to the pixel region, the pixel region displays a bright state.

14. The LCD of claim 11, wherein the electrical field is a lateral electrical field.

15. The LCD of claim 1, the liquid crystal molecules near the majority portion of the edge of the pixel electrode deform to have optical anisotropicity along with the edge of the pixel electrode.

16. The LCD of claim 1, wherein the first direction is not parallel to the first and second polarization directions.

17. The LCD of claim 16, wherein the first direction and the first or the second polarization directions have an included angle of 45 degrees.

18. The LCD of claim 1, wherein the pixel region further comprises a passivation layer disposed between the pixel electrode and the lower substrate, the passivation layer has at least one slit corresponding to the edge of the pixel electrode, and the passivation layer with the slit and the pixel electrode compose a groove structure.

* * * * *